US012120054B2

(12) United States Patent
Li et al.

(10) Patent No.: US 12,120,054 B2
(45) Date of Patent: *Oct. 15, 2024

(54) METHOD FOR TRANSMITTING REFERENCE SIGNAL, METHOD FOR RECEIVING REFERENCE SIGNAL, BASE STATION AND USER EQUIPMENT

(71) Applicant: BEIJING XIAOMI MOBILE SOFTWARE CO., LTD., Beijing (CN)

(72) Inventors: Mingju Li, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,553

(22) Filed: Jun. 6, 2023

(65) Prior Publication Data

US 2023/0318773 A1 Oct. 5, 2023

Related U.S. Application Data

(63) Continuation of application No. 17/259,540, filed as application No. PCT/CN2018/095307 on Jul. 11, 2018, now Pat. No. 11,722,274.

(51) Int. Cl.
*H04L 5/00* (2006.01)
*H04W 56/00* (2009.01)

(52) U.S. Cl.
CPC ......... *H04L 5/0048* (2013.01); *H04W 56/001* (2013.01)

(58) Field of Classification Search
CPC .............. H04L 5/0048; H04W 56/001; H04W 74/0808; H04W 72/0406; H04W 72/042
See application file for complete search history.

(56) References Cited

U.S. PATENT DOCUMENTS 10,439,847 B2 * 10/2019 Park ................... H04W 72/0473
10,805,863 B2 10/2020 Sheng et al.
(Continued)

FOREIGN PATENT DOCUMENTS

| CN | 102215580 A | 10/2011 |
|----|-------------|---------|
| CN | 102714527 A | 10/2012 |

(Continued)

OTHER PUBLICATIONS

International Search Report issued in PCT/CN2018/095307, dated Feb. 3, 2019 with English translation, (4p).

(Continued)

*Primary Examiner* — Kabir A Timory
(74) *Attorney, Agent, or Firm* — Arch & Lake LLP

(57) ABSTRACT

A method for transmitting reference signal, a method for receiving reference signal, base station and user equipment are provided. The method includes: obtaining a plurality of possible transmission positions of the reference signal according to a position where a setting signal is located, wherein the setting signal is located in the reference signal and is used to determine an index of the reference signal, and the plurality of possible transmission positions comprise an initial possible transmission position of the reference signal; performing channel detection before transmitting the reference signal at each of the possible transmission positions; and transmitting, in response to detecting that a channel is idle, the reference signal at a corresponding possible transmission position; wherein the reference signal includes a SSB, and the setting signal comprises PBCH in the SSB; the indexes of the reference signal corresponding to the plurality of possible transmission positions are the same.

17 Claims, 19 Drawing Sheets

(56) References Cited

U.S. PATENT DOCUMENTS

2017/0019924 A1   1/2017  Wang et al.
2021/0045155 A1   2/2021  Shi

FOREIGN PATENT DOCUMENTS

| CN | 103402251 A | 11/2013 |
| CN | 104753575 A | 7/2015 |
| CN | 105453507 A | 3/2016 |
| CN | 106686604 A | 5/2017 |
| CN | 107528682 A | 12/2017 |
| WO | 2018084636 A | 5/2018 |

OTHER PUBLICATIONS

First Office Action to Chinese Patent Application No. 201880001033.4 dated Jun. 29, 2020 with English translation, (8p).
Huawei, HiSilicon, "Discussion on UE Behavior During Measurement Outside Measurement Gap" 3GPP TSG-RAN WG4 Meeting NR #86, R4-1802620, Athens, Greece, Feb. 26-Mar. 3, 2018, (6p).
Vivo, "Discussion on Remaining Minimum System Information" 3GPP TSG RAN WG1 Meeting AH 1801—R1-1800174, Vancouver, Canada, Jan. 22-26, 2018, (15p).

* cited by examiner

METHOD FOR TRANSMITTING REFERENCE SIGNAL, METHOD FOR RECEIVING REFERENCE SIGNAL, BASE STATION AND USER EQUIPMENT

CROSS-REFERENCE TO RELATED APPLICATION

The present disclosure is a continuation application of U.S. patent application Ser. No. 17/259,540, filed on Jan. 11, 2021, which is based upon and claims priority to PCT Application No. PCT/CN2018/095307, filed on Jul. 11, 2018, the entire contents of which are incorporated herein by reference for all purposes.

TECHNICAL FIELD

The present disclosure relates to the field of communication technology, and more particularly, to a method and device for transmitting a reference signal, a method and device for receiving a reference signal, a base station, user equipment and a computer-readable storage medium.

BACKGROUND

Under NR (New Radio) licensed spectrum, each slot includes 14 symbols, and how many slots are contained in 1 millisecond (ms) is determined by a subcarrier interval. For example, when the subcarrier interval is 15 kilohertz (KHz), there is 1 slot in 1 ms; when the subcarrier interval is 30 KHz, there are 2 slots in 1 ms; and when the subcarrier interval is 60 KHz, there are 4 slots in 1 ms, and so on.

In NR, in order to reduce the always-on reference signal and thus reduce overhead, a Synchronization Signal Block (hereinafter referred to as SSB) is proposed. Each SSB occupies 4 consecutive symbols, which are respectively Primary Synchronization Signal (hereinafter referred to as PSS), Physical Broadcast Channel (hereinafter referred to as PBCH), Secondary Synchronization Signal (hereinafter referred to as SSS) and PBCH in sequence. 12 resource blocks (RBs) in the middle of the symbol where SSS is located are SSS, 4 RBs on each side thereof are PBCHs, and some subcarriers in the PBCHs are Demodulation Reference Signals (DMRSs). The subcarrier interval of the synchronization signal blocks may be 15 KHz, 30 KHz, 120 KHz and 240 KHz. All of the synchronization signal blocks are sent within 5 ms. In order to support beam transmission, when there are beams, each beam needs to send SSBs, so the maximum number of synchronization signal blocks that can be sent within 5 ms is 4 (when the carrier frequency is below 3 GHz) or 8 (when the carrier frequency is 3 GHz~6 GHz) or 64 (when the carrier frequency is above 6 GHz), and the plurality of SSBs within 5 ms are called a synchronization signal block set (SSB burst set). The period of the SSB burst set may be 5 ms, 10 ms, 20 ms, 40 ms, etc.

When the subcarrier interval of the synchronization signal blocks is 15 KHz, the time domain distribution of the synchronization signal blocks is that symbols 2~5 and symbols 8~11 in every 14 symbols are occupied. When the subcarrier interval is 15 KHz, the maximum number of the synchronization signal blocks is 4 or 8. Namely, a start symbol position of each of the synchronization signal blocks is $\{2, 8\}+14*n$, n is 0, 1 or 0, 1, 2, 3.

When the subcarrier interval of the synchronization signal blocks is 30 KHz, the first kind of time domain distribution of the synchronization signal blocks is that symbols 2~5 and symbols 8~11 in every 14 symbols are occupied. When the subcarrier interval is 30 KHz, the maximum number of the synchronization signal blocks is 4 or 8. Namely, the start symbol position of each of the synchronization signal blocks is $\{2, 8\}+14*n$, n is 0, 1 or 0, 1, 2, 3.

When the subcarrier interval of the synchronization signal blocks is 30 KHz, the second kind of time domain distribution of the synchronization signal blocks is that symbols 4~7, 8~11, 16~19 and 20~23 in every 28 symbols are occupied. When the subcarrier interval is 30 KHz, the maximum number of the synchronization signal blocks is 4 or 8. Namely, the start position of each of the synchronization signal blocks is $\{4, 8, 16, 20\}+28*n$, where n is 0 or n is 0, 1.

When the subcarrier interval of the synchronization signal blocks is 120 KHz, the time domain distribution of the synchronization signal blocks is that symbols 4-7, 8-11, 16-19 and 20-23 in every 28 symbols are occupied. When the subcarrier interval is 120 KHz, the maximum number of the synchronization signal blocks is 64. Namely, the start position of each of the synchronization signal blocks is $\{4, 8, 16, 20\}+28*n$, where n is 0, 1, 2, 3, 5, 6, 7, 8, 10, 11, 12, 13, 15, 16, 17, 18.

When the subcarrier interval of the synchronization signal blocks is 240 KHz, the time domain distribution of the synchronization signal blocks is that symbols 8-11, 12-15, 16-19, 20-23, 32~35, 36~39, 40~43 and 44~47 in every 56 symbols are occupied. When the subcarrier interval is 240 KHz, the maximum number of the synchronization signal blocks is 64. Namely, the start position of each of the synchronization signal blocks is $\{8, 12, 16, 20, 32, 36, 40, 44\}+56*n$, n is 0, 1, 2, 3, 5, 6, 7, 8.

In NR licensed spectrum, the channels are available at any time, therefore, for each synchronization signal block, the respective synchronization signal blocks can be sent on respective fixed time-frequency domain resources corresponding thereto, as long as the base station intends to send them. Furthermore, the synchronization signal blocks are transmitted along with respective SSB indexes, and a terminal can realize time domain synchronization with the base station according to the detected SSB index and the symbol position where the SSB, which corresponds to the SSB index written into a terminal chip, is located.

However, in the NR unlicensed spectrum, the channel in the unlicensed spectrum is not always available. The base station needs to detect whether the channel is idle or not before sending any signal, and sends the signal if the channel is idle. For example, an example of up to 4 possible transmission positions of synchronization signal blocks within 5 ms when the subcarrier interval is 15 KHz will be taken. Since SSB #0 is sent at symbols 2~5 of the first slot, if channel idling is not detected before symbol 2, SSB #0 will not be sent. SSB #1 is sent at symbols 8~11 of the first slot, and if channel idling is not detected before symbol 8, SSB #1 will not be sent. Eventually, it leads to that the chance of sending the synchronization signal blocks is extremely low, such that the terminal cannot perform time domain synchronization with the base station.

SUMMARY

In view of this, the present application discloses a method and device for transmitting a reference signal, a method and device for receiving a reference signal, a base station, user equipment and a computer-readable storage medium, to increase the chance of transmitting the reference signal and enable the UE to realize time domain synchronization through the cell where an unlicensed spectrum is located.

According to a first aspect of the present disclosure, there is provided a method for transmitting a reference signal, applied to a base station, including:

obtaining a plurality of possible transmission positions of the reference signal according to a position where a setting signal is located, wherein the setting signal is located in the reference signal and is used to determine an index of the reference signal, and the plurality of possible transmission positions include an initial possible transmission position of the reference signal;

performing channel detection before transmitting the reference signal at each of the possible transmission positions; and transmitting, in response to detecting that a channel is idle, the reference signal at a corresponding possible transmission position;

wherein the reference signal includes a synchronization signal block (SSB), and the setting signal includes PBCH in the SSB;

wherein the indexes of the reference signal corresponding to the plurality of possible transmission positions are the same.

According to a second aspect of the present disclosure, there is provided a method for receiving a reference signal, applied to user equipment (UE), including:

receiving the reference signal sent by a base station;

detecting a setting signal in the reference signal to determine a position where the setting signal is located, wherein the setting signal is used to determine an index of the reference signal;

acquiring a signal set during a preset time interval according to the position where the setting signal is located;

determining location information corresponding to the reference signal according to the signal set; and determining the index of the reference signal according to the location information, and performing time domain synchronization with the base station according to the index;

wherein the reference signal includes a synchronization signal block (SSB), and the setting signal includes PBCH in the SSB;

wherein the indexes of the reference signal corresponding to the plurality of possible transmission positions are the same.

According to a third aspect of the present disclosure, there is provided user equipment, including: a processor; and a memory, for storing instructions executable by the processor. The processor is configured to:

receive a reference signal sent by a base station;

detect a setting signal in the reference signal to determine a position where the setting signal is located, wherein the setting signal is used to determine an index of the reference signal;

acquire a signal set during a preset time interval according to the position where the setting signal is located;

determine location information corresponding to the reference signal according to the signal set; and determine the index of the reference signal according to the location information, and perform time domain synchronization with the base station according to the index;

wherein the reference signal includes a synchronization signal block (SSB), and the setting signal includes PBCH in the SSB;

wherein the indexes of the reference signal corresponding to the plurality of possible transmission positions are the same.

It is to be understood that both the foregoing general description and the following detailed description are exemplary and explanatory only, and are not restrictive of the present disclosure.

BRIEF DESCRIPTION OF THE DRAWINGS

The accompanying drawings, which are incorporated in and constitute part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
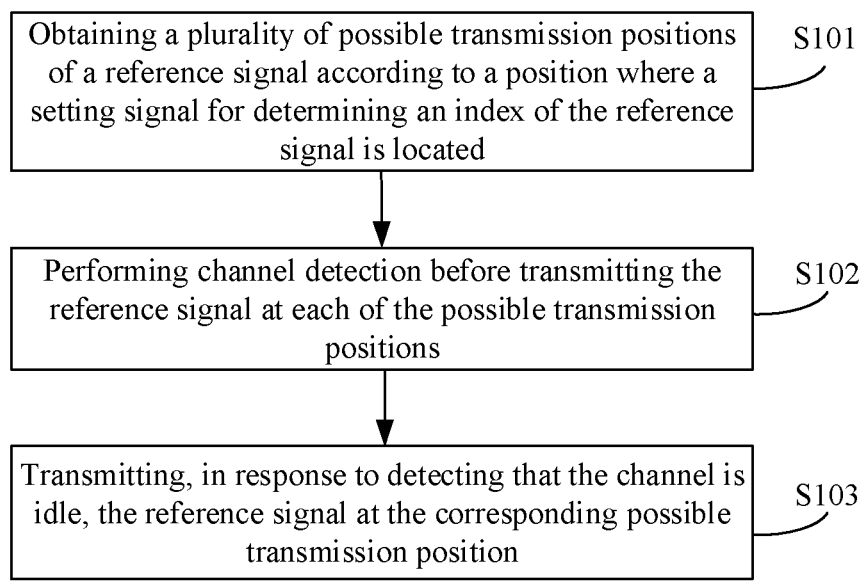
FIG. 1 is a flowchart showing a method for transmitting a reference signal according to an exemplary embodiment of the present application.

FIG. 1 is a flow chart showing a method for transmitting a reference signal according to an exemplary embodiment of the present application. This embodiment will be described from the perspective of the base station side. As shown in FIG. 1, the method for transmitting the reference signal includes the following steps.

In step S101, a plurality of possible transmission positions of the reference signal may be obtained according to a position where a setting signal for determining an index of the reference signal is located, wherein the setting signal is located in the reference signal, and the plurality of possible transmission positions of the reference signal include an initial possible transmission position of the reference signal.

In the embodiment, symbol-level cyclic shifts may be performed on other signals than a setting signal included in a main reference signal according to a position where the setting signal is located, to obtain a plurality of possible transmission positions of the reference signal, wherein the position of the setting signal in the plurality of possible transmission positions and in the main reference signal is the same, and the main reference signal refers to a reference signal corresponding to the initial possible transmission position of the reference signal.

The reference signal may include SSB, or may be other signals including SSB, for example, a Discovery Signal in an unlicensed spectrum. The setting signal may include, but is not limited to, PSS, SSS or PBCH in the SSB, and may include signals in an NR unlicensed spectrum as well. Namely, the position where the setting signal is located may be a symbol where the PSS, SSS or PBCH is located, or may be positions where the signals in the NR unlicensed spectrum are located.

Optionally, the method may further set priority of selecting the setting signal. For example, the priority may be PSS>SSS>PBCH. Namely, PSS will be firstly selected as the setting signal with priority; SSS will be secondly selected as the setting signal; and PBCH will be lastly selected as the setting signal.

Figure 2:
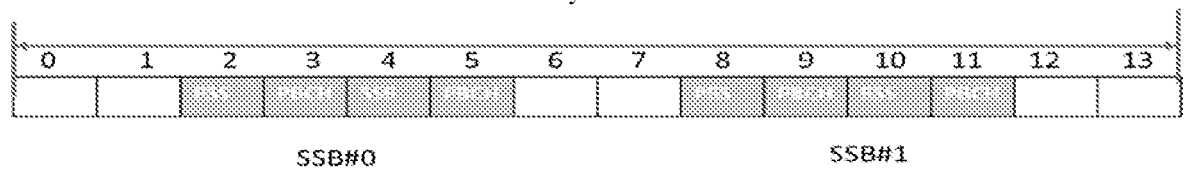
FIG. 2 is a diagram illustrating a symbol position of an SSB according to an exemplary embodiment of the present application.

For example, the process of obtaining a plurality of possible transmission positions of SSB #0 will be described by taking SSB #0 shown in FIG. 2 as an example. The position of SSB #0 as shown in FIG. 2 is the initial possible transmission position of SSB #0, that is, SSB #0 in FIG. 2 is a main SSB:

When the setting signal is PSS, symbol-level cyclic shifts may be performed on other signals than the setting signal included in the main SSB according to a position where the setting signal is located, i.e., symbol 2, to obtain a plurality of possible transmission positions of SSB:

position 11), symbols 0~3, signals sent at symbols 0~3 are SSS, PBCH, PSS and PBCH, respectively;

position 12), symbols 1~4, signals sent at symbols 1~4 are PBCH, PSS, PBCH and SSS, respectively; and position 13), symbols 2~5, symbols 2~5 are the initial possible transmission position of SSB #0, at which signals PSS, PBCH, SSS and PBCH are sent, respectively.

It should be noted that, since SSB #0 is taken as an example here and SSB cannot be sent before a 5 ms window, it is impossible to obtain the situation in which PSS is located at the end after SSB #0 is subject to the cyclic shift by using PSS as the setting signal, but for SSBs at other positions, it is possible to obtain the situation in which PSS is located at the end.

For example, as for the setting signal PSS in SSB #1, there is another position, i.e., symbols 5~8, and signals sent at symbols 5~8 are PBCH, SSS, PBCH, PSS, respectively. Namely, PSS is the last symbol in the four symbols.

As can be seen from the plurality of possible transmission positions obtained above, the position of PSS in the plurality of possible transmission positions is the same and is always located at symbol 2. The SSB indexes of the plurality of possible transmission positions are determined by the position of the symbol where PSS is located, so the SSB indexes corresponding to the plurality of possible transmission positions are the same.

When the setting signal is SSS, symbol-level cyclic shifts may be performed on other signals than the setting signal included in the main SSB according to a position where the setting signal is located, i.e., symbol 4, to obtain a plurality of possible transmission positions of SSB:

position 21), symbols 1~4, signals sent at symbols 1~4 are PBCH, PSS, PBCH and SSS, respectively;

position 22), symbols 2~5, signals sent at symbols 2~5 are PSS, PBCH, SSS and PBCH, respectively;

position 23), symbols 3~6, signals sent at symbols 3~6 are PBCH, SSS, PBCH and PSS, respectively; and position 24), symbols 4~7, signals sent at symbols 4~7 are SSS, PBCH, PSS and PBCH, respectively.

As can be seen from the plurality of possible transmission positions obtained above, the position of SSS in the plurality of possible transmission positions is the same and is always located at symbol 4. The SSB indexes of the plurality of possible transmission positions are determined by the symbol position where SSS is located, so the SSB indexes corresponding to the plurality of possible transmission positions are the same.

The process of obtaining a plurality of possible transmission positions of the reference signal when using other signals as the setting signal is similar to the above-described process, which will not be elaborated here.

In the embodiment, by performing symbol-level cyclic shifts on other signals than the setting signal included in the main reference signal, to obtain the plurality of possible transmission positions of the reference signal, the implementation manner is simple. In addition, since no signaling for indicating the index of the reference signal is added, the signaling overhead of PBCH will be saved.

In step S102, channel detection is performed before the reference signal is transmitted at each of the possible transmission positions.

In step S103, in response to detecting that the channel is idle, the reference signal may be sent at the corresponding possible transmission position.

Continuing with description by taking SSB shown in FIG. 2 as an example, when the setting signal is PSS, if the base station detects channel idling before a 5 ms sending window of a SSB burst set, SSB will be sent at symbols 0-3 of a first slot and the signals sent are SSS, PBCH, PSS and PBCH, respectively. When channel idling is detected by the base station at the first symbol (i.e., symbol 0) of the first slot, SSB will be sent at symbols 1~4 of the first slot and the signals sent are PBCH, PSS, PBCH and SSS, respectively. When channel idling is detected by the base station at symbol 1 of the first slot, SSB will be sent at symbols 2~5 of the first slot and the signals sent are PSS, PBCH, SSS and PBCH, respectively.

In the above-described embodiment, a plurality of possible transmission positions of a reference signal may be obtained according to a position where a setting signal for determining an index of the reference signal is located, channel detection may be performed before transmitting the reference signal at each of the possible transmission positions, and the reference signal may be transmitted at the corresponding possible transmission position, in response to detecting that the channel is idle, such that the chance of transmitting the reference signal can be improved.

Figure 3:
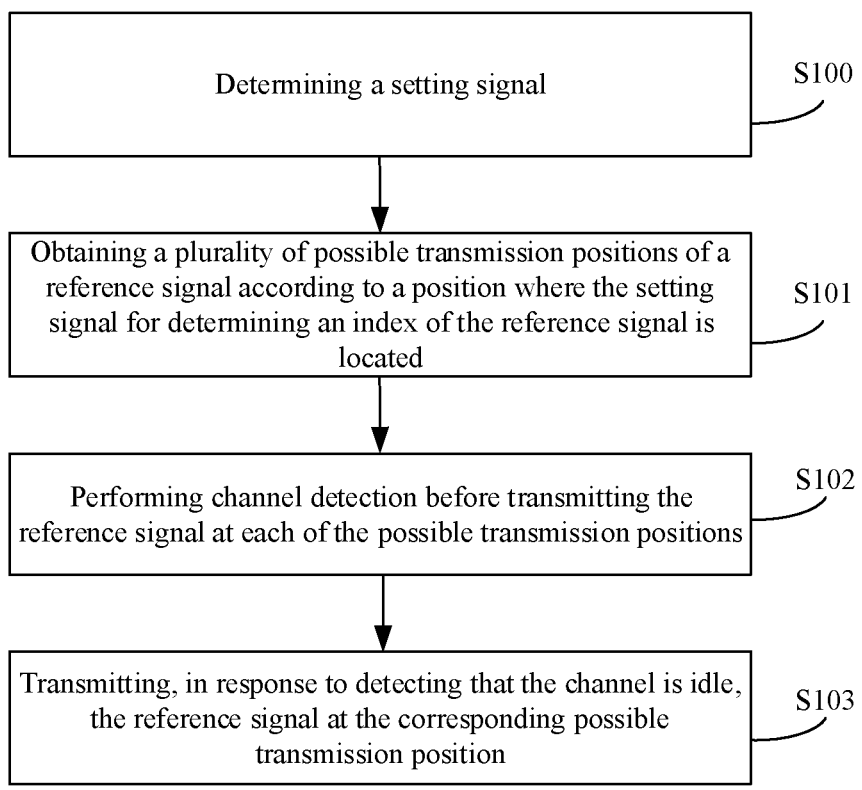
FIG. 3 is a flowchart showing another method for transmitting a reference signal according to an exemplary embodiment of the present application.

FIG. 3 is a flowchart showing another method for transmitting a reference signal according to an exemplary embodiment of the present application. As shown in FIG. 3, before step S101, the method may further include the following steps.

In step S100, the setting signal is determined.

The setting signal may be determined in many ways. For example, a signal in SSB may be determined as the setting signal. Namely, the setting signal is always the same in any case. Different signals in the SSB may be determined as the setting signal according to a transmission frequency point or a subcarrier interval of the SSB as well.

In the above-mentioned embodiment, by determining the setting signal, it provides conditions for the subsequent obtaining of the plurality of possible transmission positions of the reference signal.

Figure 4:
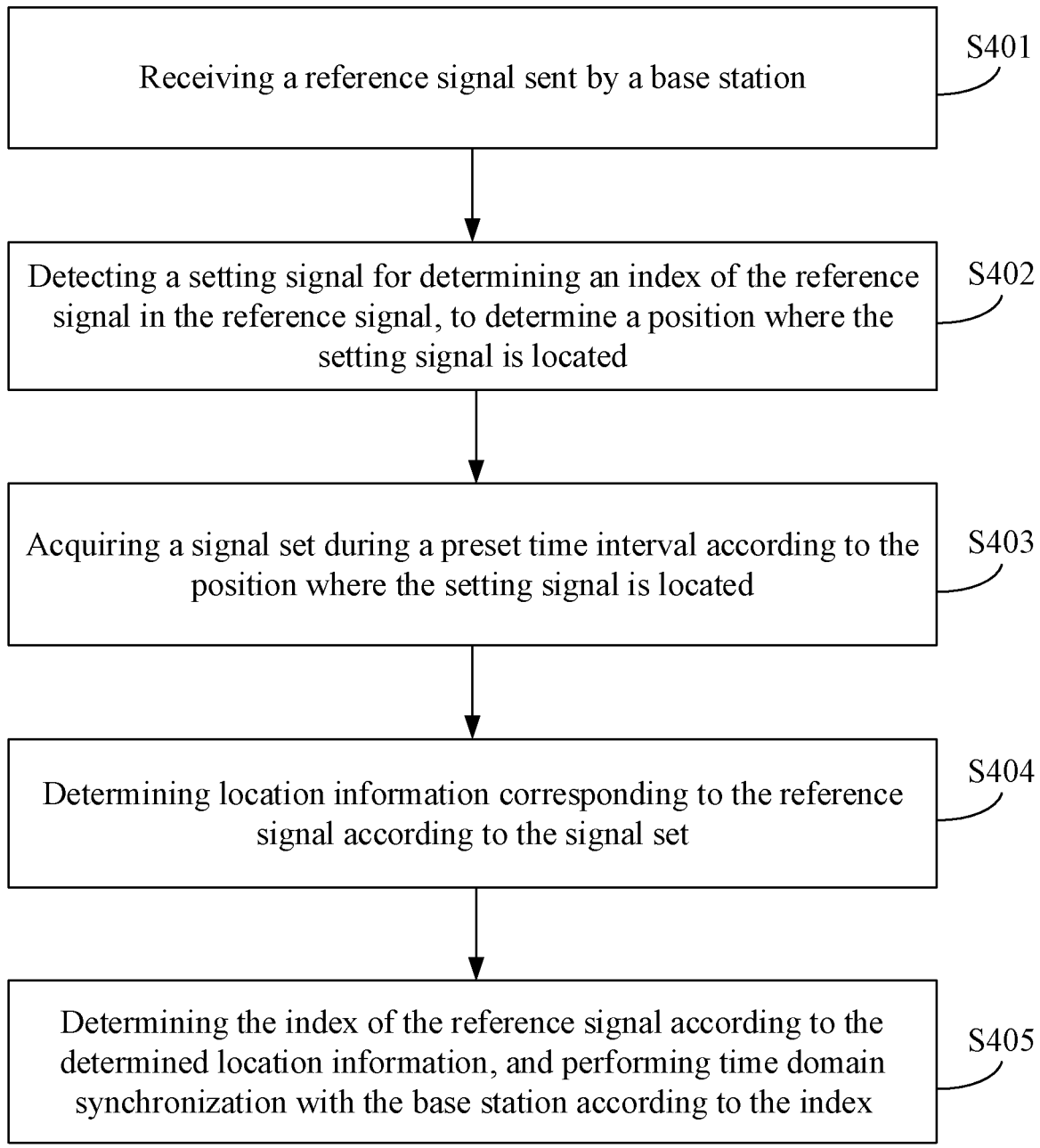
FIG. 4 is a flowchart showing a method for receiving a reference signal according to an exemplary embodiment of the present application.

FIG. 4 is a flowchart showing a method for receiving a reference signal according to an exemplary embodiment of the present application. This embodiment will be described from the perspective of the UE side. As shown in FIG. 4, the method includes the following steps.

In step S401, a reference signal sent by a base station is received.

In step S402, a setting signal for determining an index of the reference signal in the reference signal is detected to determine a position where the setting signal is located.

Optionally, the method may further include determining the setting signal before the detection of the setting signal for determining the index of the reference signal in the reference signal.

The setting signal may be determined in many ways. For example, a signal in SSB may be determined as the setting signal. Namely, the setting signal is always the same in any case. Different signals in the SSB may be determined as the setting signal according to a transmission frequency point or a subcarrier interval of the SSB.

The setting signal may include, but is not limited to, PSS, SSS or PBCH in SSB.

In step S403, a signal set during a preset time interval is obtained according to the position where the setting signal is located.

obtaining the signal set during the preset time interval according to the position where the setting signal is located includes: obtaining a first signal set during a first preset time interval and a second signal set during a second preset time interval according to the position where the setting signal is located. The first preset time interval is located before the position where the setting signal is located and the second preset time interval is located after the position where the setting signal is located, and the first and second signal sets and the setting signal form the foregoing signal set.

Figure 5:
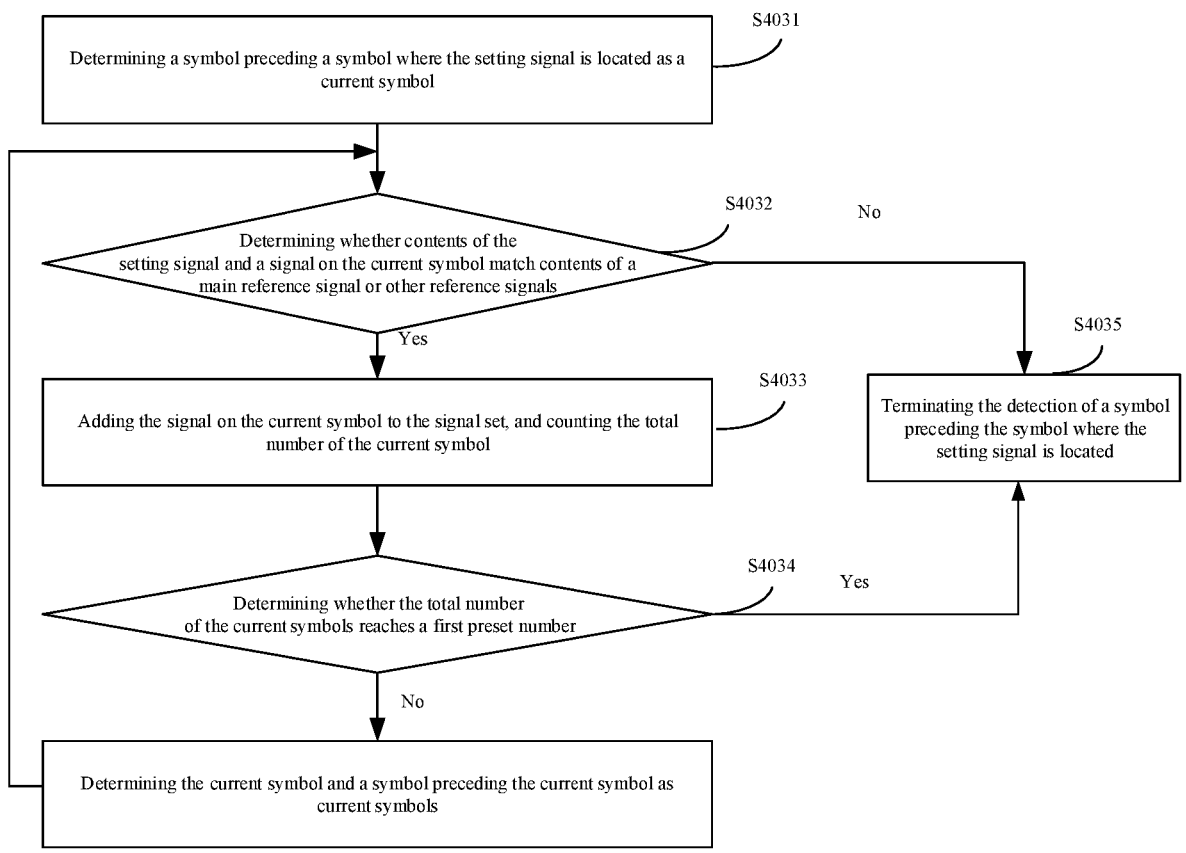
FIG. 5 is a flow chart showing acquisition of a first signal set according to an exemplary embodiment of the present application.

As shown in FIG. 5, obtaining the first signal set during the first preset time interval according to the position where the setting signal is located may include the following steps.

In step S4031, a symbol preceding a symbol where the setting signal is located is determined as a current symbol.

In step S4032, it is determined whether contents of the setting signal and a signal on the current symbol match contents of a main reference signal or other reference signals, if they match, step S4033 will be performed; and if they do not match, step S4035 will be performed.

The said other reference signals refer to reference signals obtained after performing symbol-level cyclic shifts on other signals than the setting signal in the main reference signal.

In step S4033, the signal on the current symbol is added to the signal set and the total number of the current symbols is counted.

If the signal that is newly added to the signal set is a repetitive signal of the preceding signal, the repetitive signal will be removed, that is, only a non-repetitive signal will be added.

In step S4034, it is determined whether the total number of the current symbols reaches a first preset number, and if the total number of the current symbols fails to reach the first preset number, the current symbol and a symbol preceding the current symbol are regarded as current symbols, and step S4032 is repeated; and if the first preset number is reached, step S4035 will be performed.

The first preset number may be 3.

In step S4035, the detection of a symbol preceding a symbol currently added to the signal set is terminated.

The process of obtaining the second signal set during the second preset time interval according to the position where the setting signal is located is the same as the process of obtaining the first signal set, as long as "the symbol preceding the symbol where the setting signal is located" in the above-described step is replaced with "the symbol following the symbol where the setting signal is located", which will not be elaborated here. It should be noted that, in the case of acquiring the second signal set, the first preset number may be greater than 3, for example, 15.

In order to describe the process of acquiring the signal set more clearly, hereinafter, description will be made in conjunction with the embodiment shown in FIG. 6. Assuming that the setting signal is PSS at symbol #8, the process of acquiring the signal set is as follows:

For a symbol preceding the symbol #8, symbol #7 is regarded as a current symbol, and if it is determined that contents of the setting signal PSS and signal PBCH at the symbol #7 match contents of other SSBs (since the position of PSS remains unchanged and other signals are subject to a cycle shift, PBCH may be possibly preceding the symbol where the PSS signal is located, such as the aforesaid positions 11) and 12)), the signal PBCH corresponding to the symbol #7 will be added to the signal set and the total number of the current symbols is counted as 1, and since the total number of the current symbols fails to reach the first preset number of 3, the symbol #7 and symbol #6 are used as current symbols. If it is determined that contents of the setting signal PSS, the signal PBCH at the symbol #7 and signal SSS at the symbol #6 match the contents of other SSBs (Similarly, the position of PSS remains unchanged and other signals are subject to a cycle shift, and there may be a situation in which contents transmitted by the three consecutive symbols are SSS-PBCH-PSS, such as the aforesaid position 11)), the signal PBCH at the symbol #7 and the signal SSS at the symbol #6 are added to the signal set, and since the signal PBCH corresponding to the symbol #7 has been included in the signal set already, only the signal SSS at symbol #6 will be added to the signal set, and the total number of the current symbols is counted as 2, and since the total number of the current symbols does not reach the first preset number of 3, symbol #5 to symbol #7 are used as current symbols. If it is determined that contents of the setting signal PSS, the signal PBCH at symbol #7, the signal SSS at symbol #6 and signal PBCH at symbol #5 match contents of other reference signals (similarly, the position of PSS remains unchanged and other signals are subject to a cycle shift, and there might be a situation in which contents transmitted by four consecutive symbols are PBCH-SSS-PBCH-PSS, such as the aforementioned position 23)), the signal PBCH at symbol #7, the signal SSS at symbol #6 and the signal PBCH at symbol #5 will be added to the signal set, and since the signal PBCH corresponding to symbol #7 and the signal SSS at symbol #6 have already been included in the signal set, only the signal PBCH at symbol #5 will be added to the signal set, and the total number of the current symbols is counted as 3, and since the total number of the current symbols reaches the first preset number of 3, the detection of the symbol preceding symbol #5 is stopped, and the first signal set is PBCH-SSS-PBCH on symbols #5~#7.

For symbols following symbol #8, symbol #9 may be used as a current symbol, and if it is determined that contents of the setting signal PSS and signal PBCH at the symbol #9 match contents of a main SSB (PBCH is at one symbol following the symbol where PSS is located, with reference to the symbol position of the main SSB, i.e., position 13)), the signal PBCH corresponding to the symbol #9 will be added to the signal set and the total number of the current symbols is counted as 1, and since the total number of the current symbols does not reach the first preset number of 15, the symbol #9 and symbol #10 are used as current symbols. If it is determined that contents of the setting signal PSS, the signal PBCH at the symbol #9 and null signal at the symbol #10 do not match contents of the main SSB or other SSBs, the detection of the symbols following the symbol #9 is stopped and the second signal set is PBCH at the symbol #9.

Through the above-described process, the acquired signal set is the signals at symbol #5 to symbol #9, i.e., PBCH-SSS-PBCH-PSS-PBCH.

Figure 8:
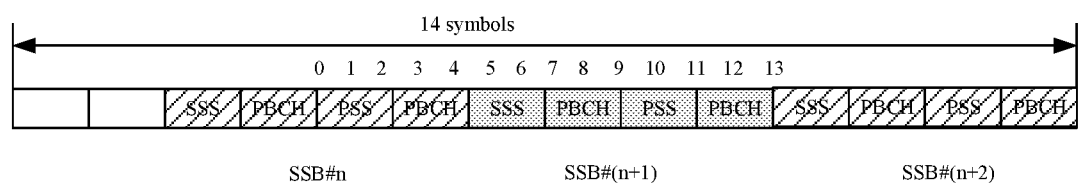
FIG. 8 is a diagram illustrating a symbol position of another SSB according to an exemplary embodiment of the present application.

For another example, SSS (i.e., SSS at symbol #6) of the second SSB in FIG. 8 is used as the setting signal, and the signal set that may be obtained through the above process is signals at symbol #3 to symbol #13.

In the embodiment, it is determined whether the contents of the signal on the current symbol and the setting signal match the contents of the main SSB or other SSBs, and when they match, the current symbol may be added to the signal set, and the above operation may be repeated till the number of the current symbols reaches the first preset number; and when they do not match, the detection of the symbol preceding or following the symbol, which is currently added to the signal set, is terminated, thus to realize the acquisition of the signal set.

In step S404, location information corresponding to the reference signal is determined according to the signal set.

Figure 7:
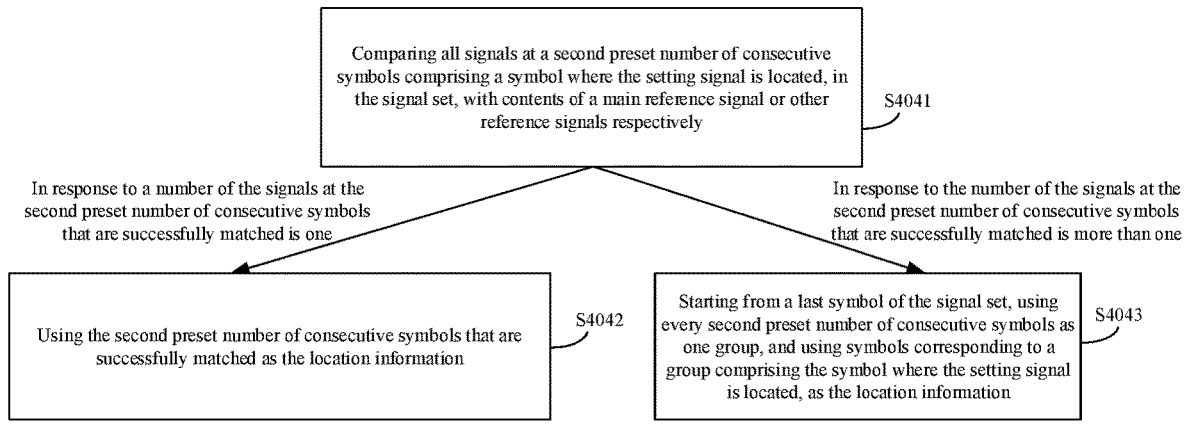
FIG. 7 is a flowchart showing determination of location information corresponding to a reference signal according to an exemplary embodiment of the present application.

In the embodiment, after the signal set is determined, the location information corresponding to the reference signal may be determined. As shown in FIG. 7, determining the location information corresponding to the reference signal may include the following steps.

In step S4041, all of the signals at a second preset number of consecutive symbols including the symbol where the setting signal is located, in the signal set, are compared with the contents of the main reference signal or other reference signals, respectively.

The second preset number may be 4.

In step S4042, in response to a number of the signals at the second preset number of consecutive symbols that are successfully matched is one, the second preset number of consecutive symbols successfully matched are used as location information.

In step S4043, in response to the number of the signals at the second preset number of consecutive symbols that are successfully matched is more than one, starting from the last symbol of the signal set, every second preset number of consecutive symbols may be used as one group, and symbols corresponding to a group containing the symbol where the setting signal is located may be used as the location information.

Figure 6:
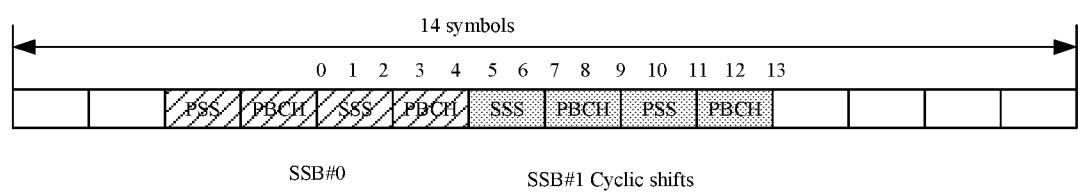
FIG. 6 is a diagram illustrating a symbol position of another SSB according to an exemplary embodiment of the present application.

Continuing with description by taking FIG. 6 as an example, since the acquired signal set is signals at symbol #5 to symbol #9, all signals at the 4 consecutive symbols including the symbol where the setting signal is located, in the signal set, are compared with the contents of the main reference signal or other reference signals, and the number of signals at the 4 consecutive symbols that are successfully matched is 2, then starting from the last symbol of the signal set, i.e., symbol #9, every 4 consecutive symbols are regarded as a group, that is, symbol #9 to symbol #6 are regarded as the first group. Since the first group contains symbol #8, symbols corresponding to the first group, i.e., symbol #9 to symbol #6, are used as the location information corresponding to the SSB.

Continuing with description by taking FIG. 8 as an example, since the acquired signal set is signals at symbol #3 to symbol #13, all signals at 4 consecutive symbols including the symbol where the setting signal is located, i.e., symbol #6, in the signal set, are compared with contents of a main SSB or other SSBs, and the number of signals at the 4 consecutive symbols that are matched successfully is more than one, then starting from the last symbol of the signal set, i.e., symbol #13, every 4 consecutive symbols are used as a group, that is, symbol #13 to symbol #10 are used as the first group and symbol #9 to symbol #6 are used as the second group; and since the second group contains symbol #6, the symbols corresponding to the second group, i.e., symbol #9 to symbol #6, are used as location information corresponding to the SSB.

In the embodiment, all of the signals at the second preset number of consecutive symbols including the symbol where the setting signal is located, in the signal set, are compared with the contents of the main reference signal or other reference signals, respectively, and when the number of the second preset number of consecutive symbols that are successfully matched is one, the second preset number of consecutive symbols that are successfully matched are used as the location information; and when the number of the second preset numbers of consecutive symbols that are successfully matched is more than one, starting from the last symbol of the signal set, every second preset number of consecutive symbols are used as a group, and the symbols corresponding to the group containing the symbol where the setting signal is located are used as the location information, thus the implementation manner is simple and the accuracy of the determination of the location information is high.

In step S405, an index of the reference signal is determined according to the determined location information, and time domain synchronization is performed with the base station according to the index.

After the location information corresponding to the SSB is determined, a SSB index carried in PBCH of the SSB at the corresponding location is decoded. Namely, a symbol position where the SSB setting signal is located is determined, such that time domain synchronization with the base station is realized.

In the above-described embodiment, the setting signal for determining the index of the reference signal in the received reference signal is detected to obtain the position where the setting signal is located, and the signal set during the preset time interval is obtained according to the position where the setting signal is located, and the location information corresponding to the reference signal is determined according to the signal set, then the index of the reference signal is determined according to the location information, and time domain synchronization with the base station is performed according to the index of the reference signal, such that time domain synchronization can be realized through the cell in the unlicensed spectrum.

Figure 9:
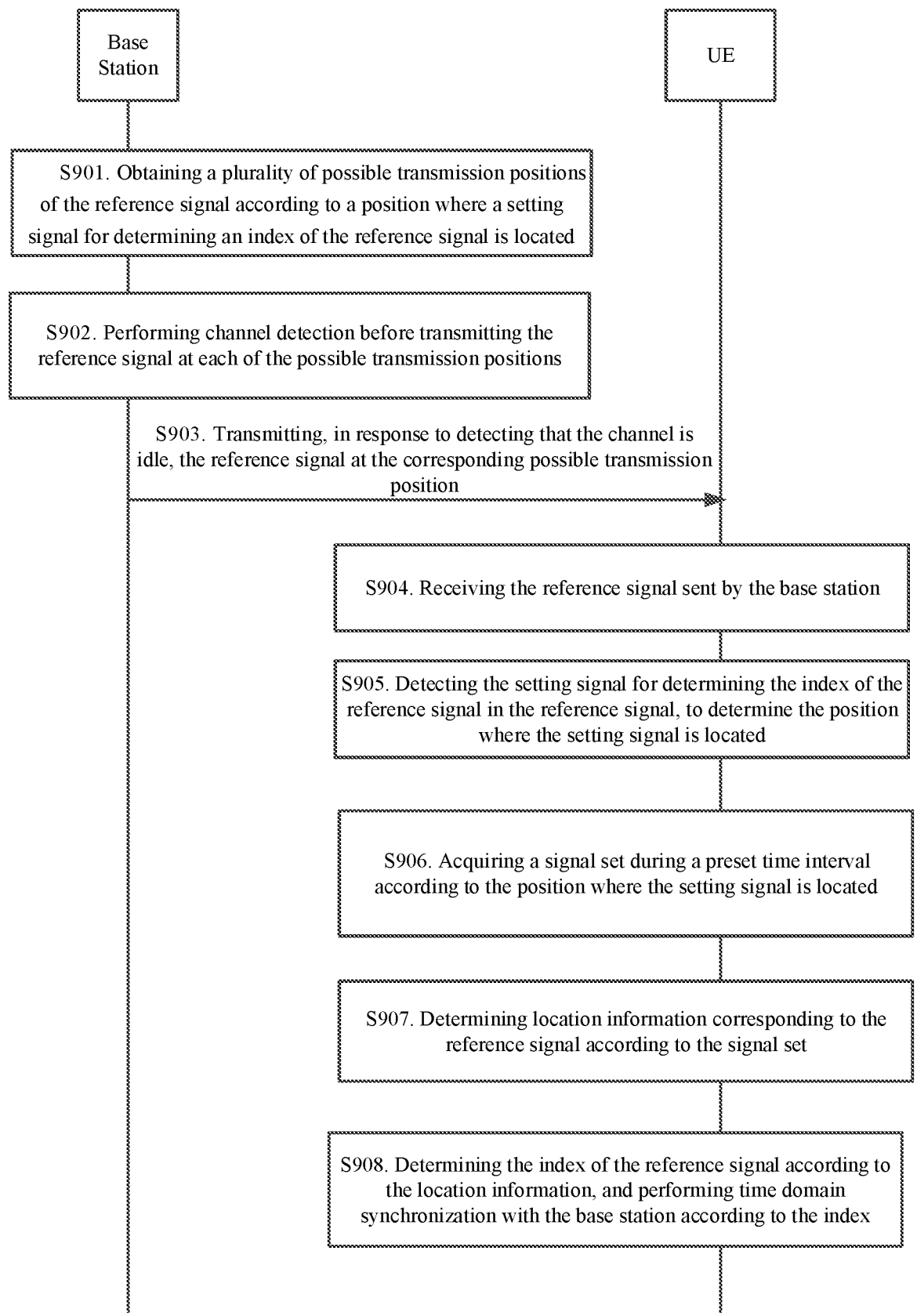
FIG. 9 is a flowchart showing signaling of a method for receiving a reference signal according to an exemplary embodiment of the present application.

FIG. 9 is a flowchart showing signaling of a method for receiving a reference signal according to an exemplary embodiment of the present application. The embodiment will be described from the perspective of interaction between a base station and a UE. As shown in FIG. 9, the method includes the following steps.

In step S901, the base station obtains a plurality of possible transmission positions of the reference signal according to a position where a setting signal for determining an index of the reference signal is located.

In step S902, the base station performs channel detection before transmitting the reference signal at each of the possible transmission positions.

In step S903, if the base station detects channel idling, it transmits the reference signal at the corresponding possible transmission position.

In step S904, the UE receives the reference signal sent by the base station.

In step S905, the UE detects the setting signal for determining the index of the reference signal in the reference signal, to obtain the position where the setting signal is located.

In step S906, the UE obtains a signal set during a preset time interval according to the position where the setting signal is located.

In step S907, the UE determines the location information corresponding to the reference signal according to the signal set.

In step S908, the UE determines the index of the reference signal according to the above-mentioned location information, and performs time domain synchronization with the base station according to the index.

In the above-mentioned embodiment, through the interaction between the base station and the UE, the base station can increase the chance of transmitting the reference signal, such that the UE can realize time domain synchronization through the cell in the unlicensed spectrum.

Figure 10:
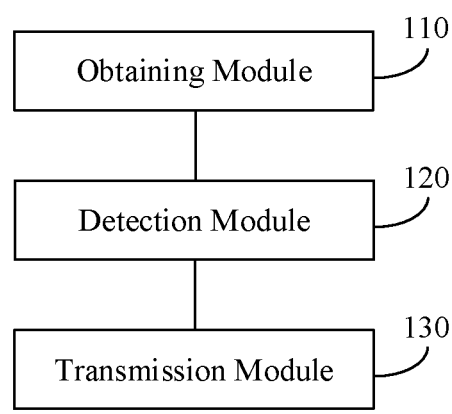
FIG. 10 is a block diagram illustrating a device for transmitting a reference signal according to an exemplary embodiment.

FIG. 10 is a block diagram illustrating a device for transmitting a reference signal according to an exemplary embodiment. The device may be located in a base station. As shown in FIG. 10, the device includes an obtaining module 110, a detection module 120 and a transmission module 130.

The obtaining module 110 is configured to obtain a plurality of possible transmission positions of the reference signal according to a position where a setting signal for determining an index of the reference signal is located, wherein the setting signal is located in the reference signal.

In the embodiment, symbol-level cyclic shifts may be performed on other signals than the setting signal included in a main reference signal according to the position where the setting signal is located, to obtain the plurality of possible transmission positions of the reference signal, wherein the position of the setting signal in the plurality of possible transmission positions and in the main reference signal is the same, and the main reference signal refers to a reference signal corresponding to the initial possible transmission position of the reference signal.

The reference signal may include SSB, or may be other signals including SSB, for example, a Discovery Signal in an unlicensed spectrum. The setting signal may include, but is not limited to, PSS, SSS or PBCH in the reference signal, and may include signals in an NR unlicensed spectrum as well. Namely, the position where the setting signal is located may be a symbol where the PSS, SSS or PBCH is located, or may be positions where the signals in the NR unlicensed spectrum are located.

Optionally, the method may further set priority of selecting the setting signal. For example, the priority may be PSS>SSS>PBCH. Namely, PSS will be firstly selected as the setting signal with priority; SSS will be secondly selected as the setting signal; and PBCH will be lastly selected as the setting signal.

For example, the process of obtaining a plurality of possible transmission positions of SSB #0 will be described by taking SSB #0 shown in FIG. 2 as an example. The position of SSB #0 as shown in FIG. 2 is the initial possible transmission position of SSB #0, that is, SSB #0 in FIG. 2 is a main SSB:

When the setting signal is PSS, symbol-level cyclic shifts may be performed on other signals than the setting signal included in the main SSB according to a position where the setting signal is located, i.e., symbol 2, to obtain a plurality of possible transmission positions of SSB:

position 11), symbols 0~3, signals sent at symbols 0~3 are SSS, PBCH, PSS and PBCH, respectively;

position 12), symbols 1~4, signals sent at symbols 1~4 are PBCH, PSS, PBCH and SSS, respectively; and position 13), symbols 2~5, symbols 2~5 are the initial possible transmission position of SSB #0, at which signals PSS, PBCH, SSS and PBCH are sent, respectively.

It should be noted that, since SSB #0 is taken as an example here and SSB cannot be sent before a 5 ms window, it is impossible to obtain the situation in which PSS is located at the end after SSB #0 is subject to the cyclic shift by using PSS as the setting signal, but for SSBs at other positions, it is possible to obtain the situation in which PSS is located at the end.

For example, as for the setting signal PSS in SSB #1, there is another position, i.e., symbols 5~8, and signals sent at symbols 5~8 are PBCH, SSS, PBCH and PSS, respectively. Namely, PSS is the last symbol in the four symbols.

As can be seen from the plurality of possible transmission positions obtained above, the position of PSS in the plurality of possible transmission positions is the same and is always located at symbol 2. The SSB indexes of the plurality of possible transmission positions are determined by the position of the symbol where PSS is located, so the SSB indexes corresponding to the plurality of possible transmission positions are the same.

When the setting signal is SSS, symbol-level cyclic shifts may be performed on other signals than the setting signal included in the main SSB according to a position where the setting signal is located, i.e., symbol 4, to obtain a plurality of possible transmission positions of SSB:

position 21), symbols 1~4, signals sent at symbols 1~4 are PBCH, PSS, PBCH and SSS, respectively;

position 22), symbols 2~5, signals sent at symbols 2~5 are PSS, PBCH, SSS and PBCH, respectively;

position 23), symbols 3~6, signals sent at symbols 3~6 are PBCH, SSS, PBCH, PSS, respectively; and position 24), symbols 4~7, signals sent at symbols 4~7 are SSS, PBCH, PSS and PBCH, respectively.

As can be seen from the plurality of possible transmission positions obtained above, the position of SSS in the plurality of possible transmission positions is the same and is always located at symbol 4. The SSB indexes of the plurality of possible transmission positions are determined by the symbol position where SSS is located, so the SSB indexes corresponding to the plurality of possible transmission positions are the same.

The process of obtaining a plurality of possible transmission positions of the reference signal when using other signals as the setting signal is similar to the above-described process, which will not be elaborated here.

In the embodiment, by performing symbol-level cyclic shifts on other signals than the setting signal included in the main reference signal, to obtain the plurality of possible transmission positions of the reference signal, the implementation manner is simple. In addition, since no signaling for indicating the index of the reference signal is added, the signaling overhead of PBCH will be saved.

The detection module 120 is configured to perform channel detection before transmitting the reference signal at each of the possible transmission positions obtained by the obtaining module 110.

The transmission module 130 is configured to transmit the reference signal at the corresponding possible transmission position, in response to that the channel is idle is detected by the detection module 120.

Continuing with description by taking SSB shown in FIG. 2 as an example, when the setting signal is PSS, if the base station detects channel idling before a 5 ms sending window of a SSB burst set, SSB will be sent at symbols 0~3 of a first slot and the signals sent are SSS, PBCH, PSS and PBCH, respectively. When channel idling is detected by the base station at the first symbol (i.e., symbol 0) of the first slot, SSB will be sent at symbols 1~4 of the first slot and the signals sent are PBCH, PSS, PBCH and SSS, respectively. When channel idling is detected by the base station at symbol 1 of the first slot, SSB will be sent at symbols 2~5 of the first slot and the signals sent are PSS, PBCH, SSS and PBCH, respectively.

In the above-described embodiment, a plurality of possible transmission positions of a reference signal may be obtained according to a position where a setting signal for determining an index of the reference signal is located, channel detection may be performed before transmitting the reference signal at each of the possible transmission positions, and the reference signal may be transmitted at the corresponding possible transmission position, in response to detecting that the channel is idle, such that the chance of transmitting the reference signal can be improved.

Figure 11:
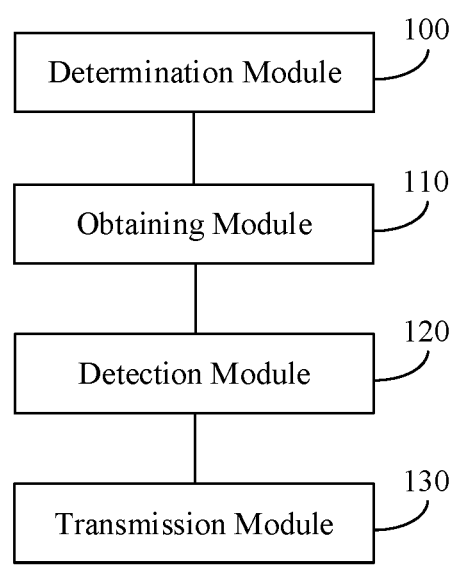
FIG. 11 is a block diagram illustrating another device for transmitting a reference signal according to an exemplary embodiment.

FIG. 11 is a block diagram illustrating another device for transmitting a reference signal according to an exemplary embodiment. As shown in FIG. 11, based on the embodiment shown in FIG. 10, the device may further include a determination module 100.

The determination module 100 is configured to determine the setting signal before the obtaining module 110 obtains the plurality of possible transmission positions of the reference signal according to the position where the setting signal for determining the index of the reference signal is located.

The setting signal may be determined in many ways. For example, a signal in the reference signal may be determined as the setting signal. Namely, the setting signal is always the same in any case. Different signals in the reference signal may be determined as the setting signal according to a transmission frequency point or a subcarrier interval of the reference signal as well.

In the above-mentioned embodiment, by determining the setting signal, it provides conditions for the subsequent obtaining of the plurality of possible transmission positions of the reference signal.

Figure 12:
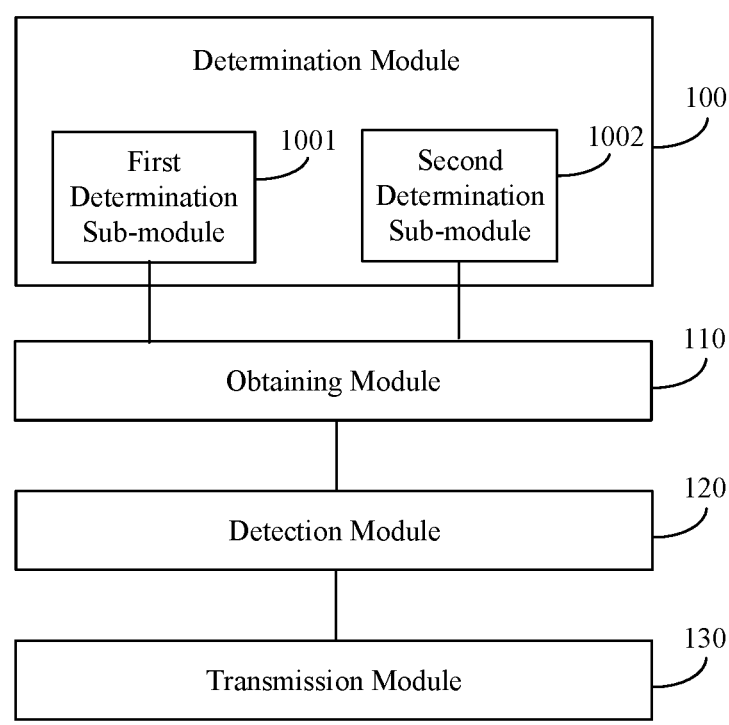
FIG. 12 is a block diagram illustrating another device for transmitting a reference signal according to an exemplary embodiment.

FIG. 12 is a block diagram illustrating another device for transmitting a reference signal according to an exemplary embodiment. As shown in FIG. 12, based on the embodiment shown in FIG. 11, the determination module 100 may include a first determination sub-module 1001 or a second determination sub-module 1002.

The first determination sub-module 1001 is configured to determine a signal in the reference signal as the setting signal.

The second determination sub-module 1002 is configured to determine different signals in the reference signal as the setting signal according to a transmission frequency point or a subcarrier interval of the reference signal.

In the above-described embodiment, the setting signal may be determined in a variety of ways and the implementation manner is flexible and diverse.

Figure 13:
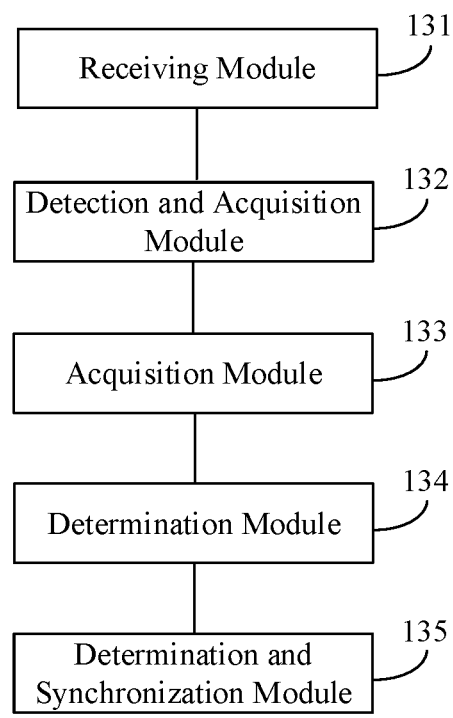
FIG. 13 is a block diagram illustrating a device for receiving a reference signal according to an exemplary embodiment.

FIG. 13 is a block diagram illustrating a device for receiving a reference signal according to an exemplary embodiment. The device may be located in a UE. As shown in FIG. 13, the device includes a receiving module 131, a detection and acquisition module 132, an acquisition module 133, a determination module 134 and a determination and synchronization module 135.

The receiving module 131 is configured to receive a reference signal sent by a base station.

The detection and acquisition module 132 is configured to detect a setting signal for determining an index of the reference signal in the reference signal received by the receiving module 131, to determine a position where the setting signal is located.

The setting signal may include, but is not limited to, PSS, SSS or PBCH in SSB.

The acquisition module 133 is configured to acquire a signal set during a preset time interval according to the position where the setting signal is located, which is obtained by the detection and acquisition module 132.

The determination module 134 is configured to determine location information corresponding to the reference signal according to the signal set acquired by the acquisition module 133.

The determination and synchronization module 135 is configured to determine the index of the reference signal according to the location information determined by the determination module 134, and perform time domain synchronization with the base station according to the index.

After determining the location information corresponding to the SSB, a SSB index carried in PBCH of the SSB at the corresponding location is decoded. Namely, a symbol position where the SSB setting signal is located is determined, such that time domain synchronization with the base station is realized.

In the above-described embodiment, the setting signal for determining the index of the reference signal in the received reference signal is detected to obtain the position where the setting signal is located, and the signal set during the preset time interval is obtained according to the position where the setting signal is located, and the location information corresponding to the reference signal is determined according to the signal set, then the index of the reference signal is determined according to the location information, and time domain synchronization with the base station is performed according to the index of the reference signal, such that time domain synchronization can be realized through the cell where the unlicensed spectrum is located.

Figure 14:
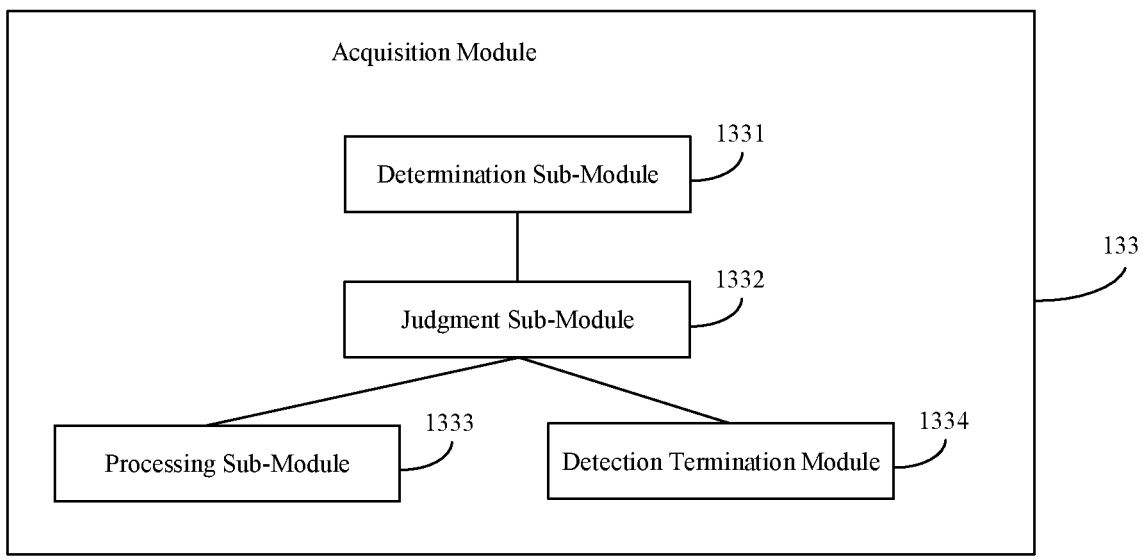
FIG. 14 is a block diagram illustrating another device for receiving a reference signal according to an exemplary embodiment.

FIG. 14 is a block diagram illustrating another device for receiving a reference signal according to an exemplary embodiment. As shown in FIG. 14, on the basis of the above-described embodiment shown in FIG. 13, the acquisition module 133 may include a determination sub-module 1331, a judgment sub-module 1332, a processing sub-module 1333 and a detection termination module 1334.

The determination sub-module 1331 is configured to determine a symbol preceding or following a symbol where the setting signal is located as a current symbol.

The judgment sub-module 1332 is configured to determine whether contents of the setting signal and a signal on the current symbol determined by the determination sub-module 1331 match contents of a main reference signal or other reference signals, wherein the said other reference signals refer to reference signals obtained after performing symbol-level cyclic shifts on other signals than the setting signal in the main reference signal.

The processing sub-module 1333 is configured to, when the result of the judgment sub-module 1332 is matching, add the signal on the current symbol to the signal set, count the total number of the current symbols, and when the total number does not reach a first preset number, correspondingly use the current symbol and a symbol preceding the current symbol, or the current symbol and a symbol following the current symbol, as current symbols, and call the judgment sub-module to repeat the operation of determining whether signals on the current symbols and the setting signal match the contents of the main reference signal or the said other reference signals, till the total number reaches the first preset number.

If the signal that is newly added to the signal set is a repetitive signal of the preceding signal, the repetitive signal will be removed, that is, only a non-repetitive signal will be added.

For the symbols preceding the current symbol, the first preset number may be 3, and for the symbols following the current symbol, the first preset number may be 15.

The detection termination module 1334 is configured to, when the result of the judgment sub-module 1332 is not matching, terminate the detection of a symbol preceding a symbol currently added to the signal set or a symbol following the symbol currently added to the signal set.

In the embodiment, it is determined whether the contents of the signal on the current symbol and the setting signal match the contents of the main reference signal or other reference signals, and when they match, the current symbol may be added to the signal set, and the above operation may be repeated till the number of the current symbols reaches the first preset number; and when they do not match, the detection of the symbol preceding or following the symbol which is currently added to the signal set, is terminated, thus to realize the acquisition of the signal set.

Figure 15:
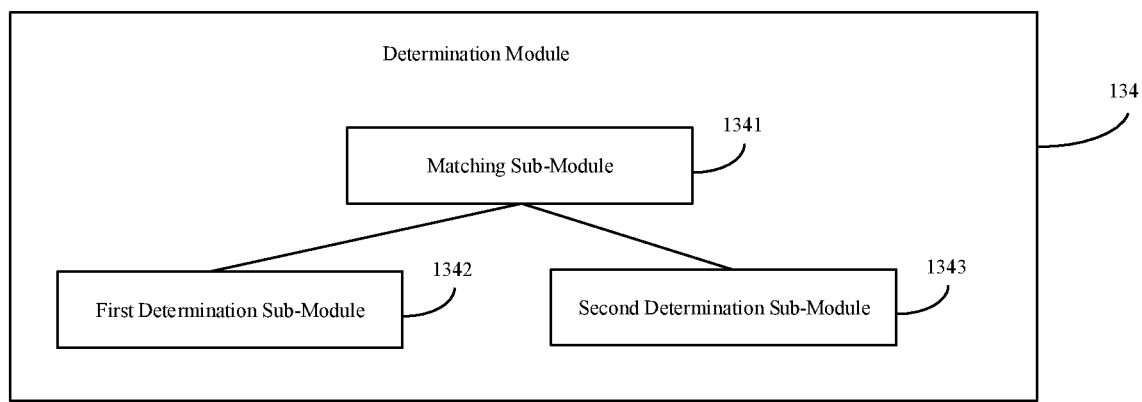
FIG. 15 is a block diagram illustrating another device for receiving a reference signal according to an exemplary embodiment.

FIG. 15 is a block diagram illustrating another device for receiving a reference signal according to an exemplary embodiment. As shown in FIG. 15, based on the above-described embodiment shown in FIG. 13, the determination module 134 may include a matching sub-module 1341, a first determination sub-module 1342 and a second determination sub-module 1343.

The matching sub-module 1341 is configured to compare, all of the signals at a second preset number of consecutive symbols including the symbol where the setting signal is located, in the signal set, with the contents of the main reference signal or other reference signals, respectively.

The second preset number may be 4.

The first determination sub-module 1342 is configured to, in response to a number of the signals at the second preset number of consecutive symbols that are successfully matched by the matching sub-module 1341 is one, use the second preset number of consecutive symbols that are successfully matched as the location information.

The second determination sub-module 1343 is configured to, in response to the number of the signals at the second preset number of consecutive symbols that are successfully matched by the matching sub-module 1341 is more than one, starting from the last symbol of the signal set, use every second preset number of consecutive symbols as one group, and use symbols corresponding to a group containing the symbol where the setting signal is located as the location information In the embodiment, all of the signals at the second preset number of consecutive symbols including the symbol where the setting signal is located, in the signal set, are compared with the contents of the main reference signal or other reference signals, respectively, and when the number of the second preset number of consecutive symbols that are successfully matched is one, the second preset number of consecutive symbols that are successfully matched are used as the location information; and when the number of the second preset numbers of consecutive symbols that are successfully matched is more than one, starting from the last symbol of the signal set, every second preset number of consecutive symbols are used as a group, and the symbols corresponding to the group containing the symbol where the setting signal is located are used as the location information, thus the implementation manner is simple and the accuracy of the determination of the location information is high.

Figure 16:
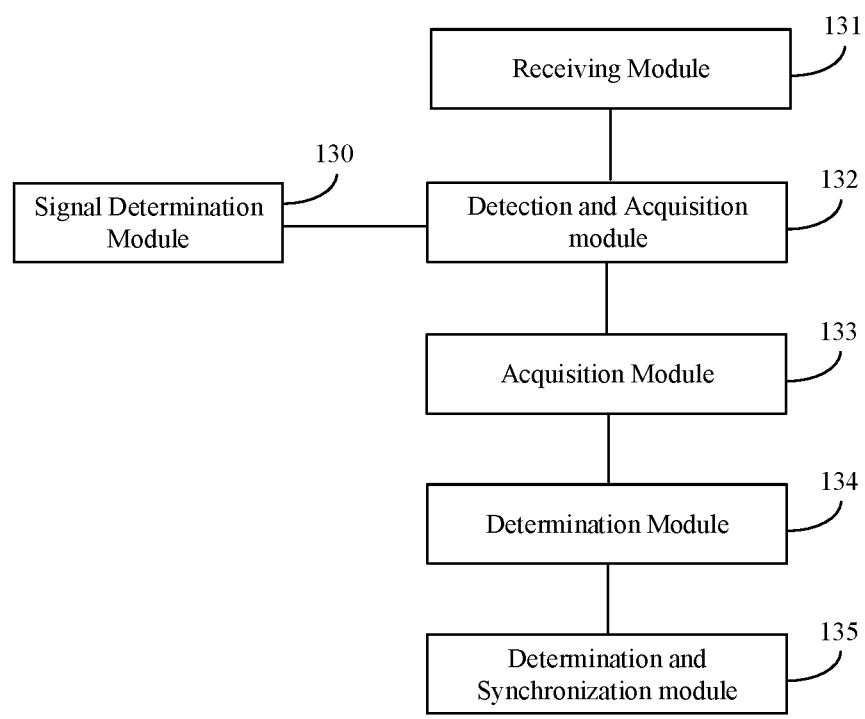
FIG. 16 is a block diagram illustrating another device for receiving a reference signal according to an exemplary embodiment.

FIG. 16 is a block diagram illustrating another device for receiving a reference signal according to an exemplary embodiment. As shown in FIG. 16, on the basis of the above-described embodiment shown in FIG. 13, the device may further include a signal determination module 130.

The signal determination module 130 is configured to determine the setting signal before the detection and acquisition module 132 detects the setting signal for determining the index of the reference signal in the reference signal.

In the above-mentioned embodiment, by determining the setting signal, it provides conditions for the subsequent obtaining of the signal set.

Figure 17:
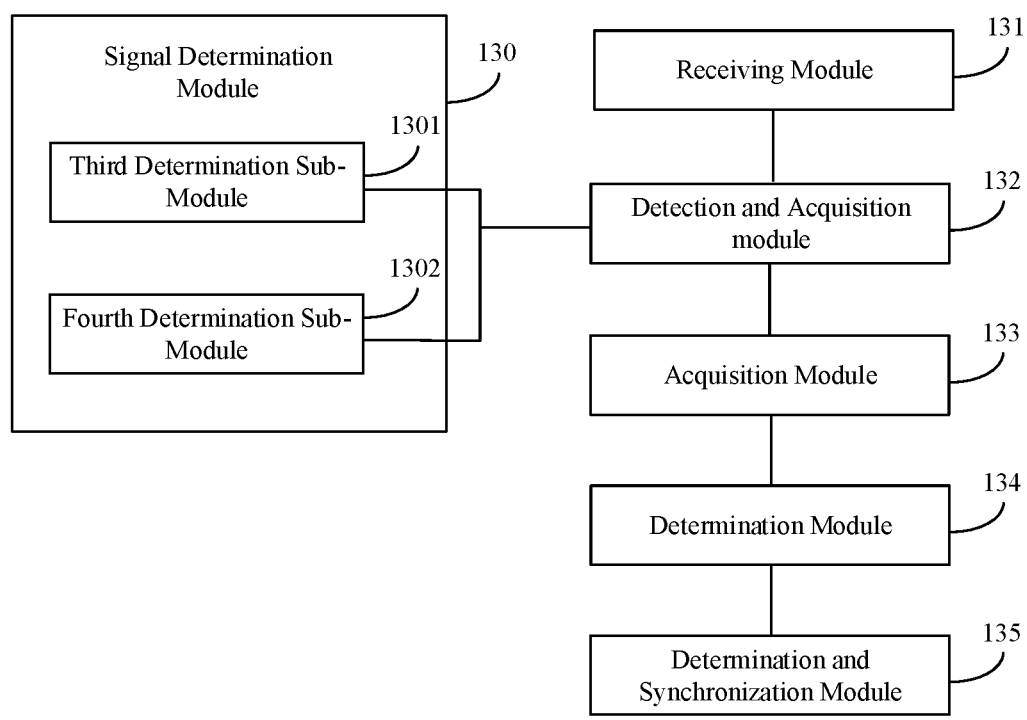
FIG. 17 is a block diagram illustrating another device for receiving a reference signal according to an exemplary embodiment.

FIG. 17 is a block diagram illustrating another device for receiving a reference signal according to an exemplary embodiment. As shown in FIG. 17, based on the above-described embodiment shown in FIG. 16, the signal determination module 130 may include a third determination sub-module 1301 or a fourth determination sub-module 1302.

The third determination sub-module 1301 is configured to determine a setting signal in the reference signal as the setting signal.

The fourth determination sub-module 1302 is configured to determine different signals in the reference signal as the setting signal according to a transmission frequency point or a subcarrier interval of the reference signal.

In the above-described embodiment, the setting signal may be determined in a variety of ways and the implementation manner is flexible and diverse.

Figure 18:
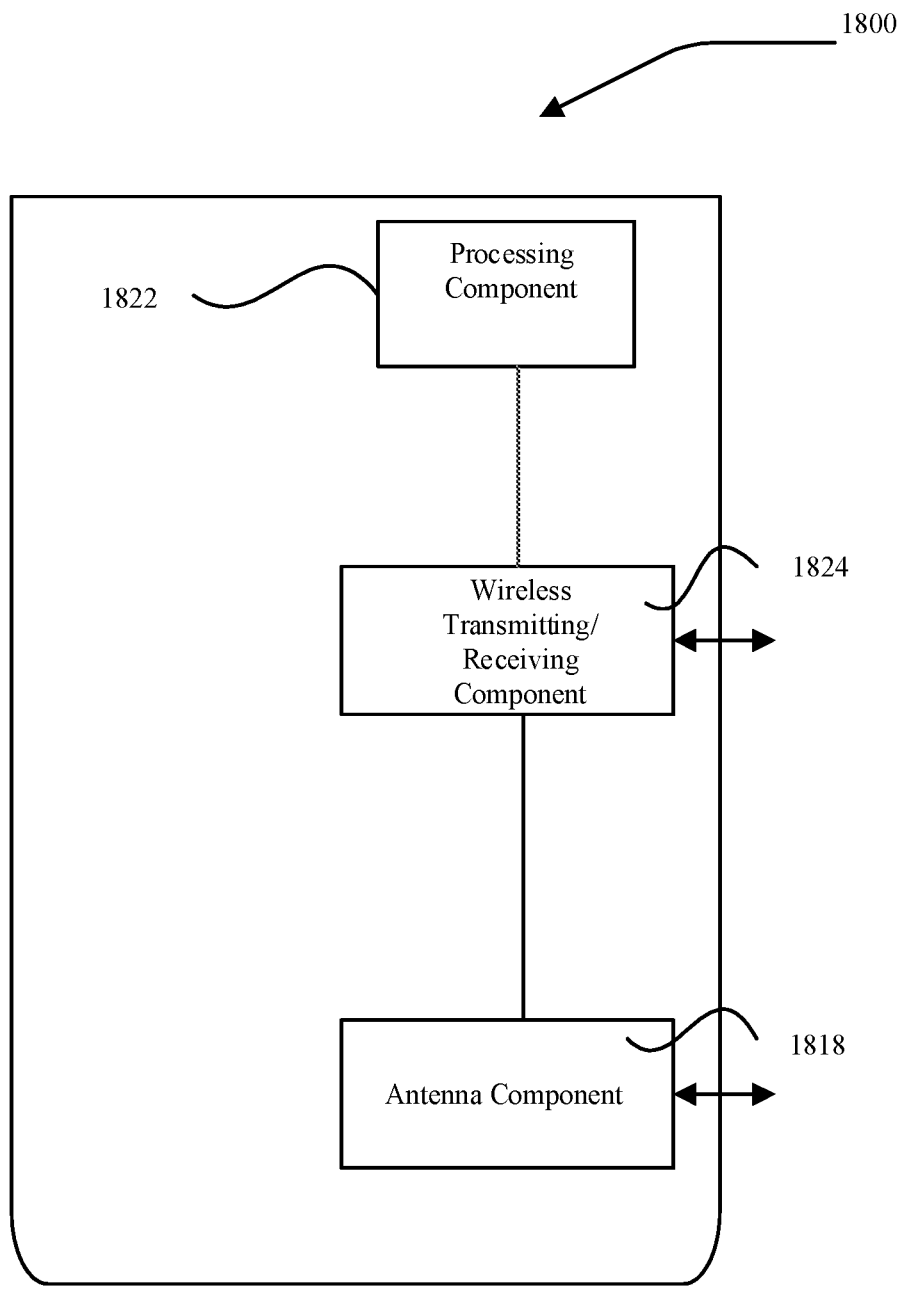
FIG. 18 is a block diagram illustrating a device for transmitting a reference signal according to an exemplary embodiment.

FIG. 18 is a block diagram illustrating a device for transmitting a reference signal according to an exemplary embodiment. The device 1800 may be provided as a base station. Referring to FIG. 18, the device 1800 includes a processing component 1822, a wireless transmitting/receiving component 1824, an antenna component 1826, and a signal processing portion specific to a wireless interface. The processing component 1822 may further include one or more processors.

One of the processors in the processing component 1822 may be configured to:
- obtain a plurality of possible transmission positions of a reference signal according to a position where a setting signal for determining an index of the reference signal is located, wherein the setting signal is located in the reference signal, and the plurality of possible transmission positions include an initial possible transmission position of the reference signal;
- perform channel detection before transmitting the reference signal at each of the possible transmission positions; and
- transmit, in response to detecting that the channel is idle, the reference signal at the corresponding possible transmission position.

In an exemplary embodiment, there is further provided a non-transitory computer-readable storage medium including instructions executable by the processing component 1822 in the device 1800, for performing the above-described methods for transmitting a reference signal. For example, the non-transitory computer-readable storage medium may be a ROM, a RAM, a CD-ROM, a magnetic tape, a floppy disc, an optical data storage device, and the like.

Figure 19:
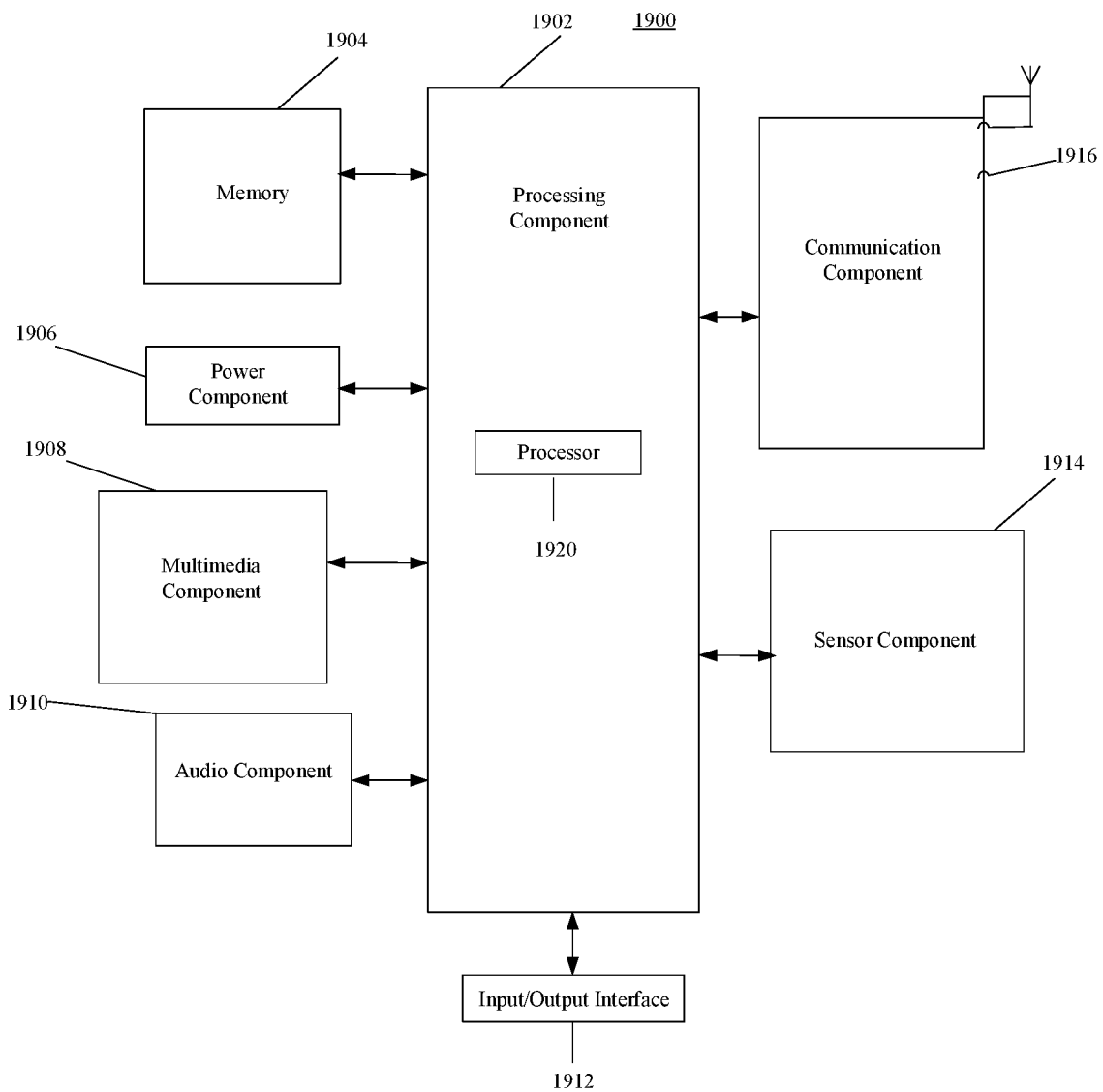
FIG. 19 is a block diagram illustrating a device for receiving a reference signal according to an exemplary embodiment.

FIG. 19 is a block diagram illustrating a device for receiving a reference signal according to an exemplary embodiment. For example, the device 1900 may be a mobile phone, a computer, a digital broadcast terminal, a messaging device, a gaming console, a tablet PC, a medical device, exercise equipment, a personal digital assistant, and the like.

Referring to FIG. 19, the device 1900 may include one or more of the following components: a processing component 1902, a memory 1904, a power component 1906, a multimedia component 1908, an audio component 1910, an input/output (I/O) interface 1912, a sensor component 1914, and a communication component 1916.

The processing component 1902 typically controls overall operations of the device 1900, such as the operations associated with display, telephone calls, data communications, camera operations, and recording operations. The processing component 1902 may include one or more processors 1920 to execute instructions to perform all or part of the steps in the above described methods. Moreover, the processing component 1902 may include one or more modules which facilitate the interaction between the processing component 1902 and other components. For instance, the processing component 1902 may include a multimedia module to facilitate the interaction between the multimedia component 1908 and the processing component 1902.

One of the processors 1920 in the processing component 1902 may be configured to:
- receive a reference signal sent by a base station;
- detect a setting signal for determining an index of the reference signal in the reference signal to determine a position where the setting signal is located;
- acquire a signal set during a preset time interval according to the position where the setting signal is located;
- determine location information corresponding to the reference signal according to the signal set; and
- determine the index of the reference signal according to the location information, and perform time domain synchronization with the base station according to the index.

The memory 1904 is configured to store various types of data to support the operation of the device 1900. Examples of such data include instructions for any applications or methods operated on the device 1900, contact data, phonebook data, messages, pictures, video, etc. The memory 1904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1906 provides power to various components of the device 1900. The power component 1906 may include a power management system, one or more power sources, and any other components associated with the generation, management, and distribution of power in the device 1900.

The multimedia component 1908 includes a screen providing an output interface between the device 1900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1908 includes a front camera and/or a rear camera. The front camera and the rear camera may receive an external multimedia datum while the device 1900 is in an operation mode, such as a photographing mode or a video mode. Each of the front camera and the rear camera may be a fixed optical lens system or have focus and optical zoom capability.

The audio component 1910 is configured to output and/or input audio signals. For example, the audio component 810 includes a microphone ("MIC") configured to receive an external audio signal when the device 1900 is in an operation mode, such as a call mode, a recording mode, and a voice recognition mode. The received audio signal may be further stored in the memory 1904 or transmitted via the communication component 1916. In some embodiments, the audio component 1910 further includes a speaker to output audio signals.

The I/O interface 1912 provides an interface between the processing component 1902 and peripheral interface modules, such as a keyboard, a click wheel, buttons, and the like. The buttons may include, but are not limited to, a home button, a volume button, a starting button, and a locking button.

The sensor component 1914 includes one or more sensors to provide status assessments of various aspects of the device 1900. For instance, the sensor component 1914 may detect an open/closed status of the device 1900, relative positioning of components, e.g., the display and the keypad, of the device 1900, a change in position of the device 1900 or a component of the device 1900, a presence or absence of user contact with the device 1900, an orientation or an acceleration/deceleration of the device 1900, and a change in temperature of the device 1900. The sensor component 1914 may include a proximity sensor configured to detect the presence of nearby objects without any physical contact. The sensor component 1914 may further include a light sensor, such as a CMOS or CCD image sensor, for use in imaging applications. In some embodiments, the sensor component 1914 may further include an accelerometer sensor, a gyroscope sensor, a magnetic sensor, a pressure sensor, or a temperature sensor.

The communication component 1916 is configured to facilitate communication, wired or wirelessly, between the device 1900 and other devices. The device 1900 can access a wireless network based on a communication standard, such as WiFi, 2G, 3G, 4G or 5G or a combination thereof. In one exemplary embodiment, the communication component 1916 receives a broadcast signal or broadcast associated information from an external broadcast management system via a broadcast channel. In one exemplary embodiment, the communication component 1916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device 1900 may be implemented by one or more application specific integrated circuits (ASICs), digital signal processors (DSP), digital signal processing devices (DSPD), programmable logic devices (PLD), Field programmable gate array (FPGA), controller, microcontroller, microprocessor or other electronic components are implemented to implement the above methods.

In an exemplary embodiment, there is further provided a non-transitory computer-readable storage medium including instructions, such as a memory 1904 including instructions, which may be executed by the processor 1920 of the device 1900 to complete the foregoing method. For example, the non-transitory computer-readable storage medium may be ROM, random access memory (RAM), CD-ROM, magnetic tape, floppy disk, optical data storage device, etc.

In an embodiment, obtaining the plurality of possible transmission positions of the reference signal according to the position where the setting signal for determining the index of the reference signal is located comprises:

performing symbol-level cyclic shifts on other signals than the setting signal included in a main reference signal according to the position where the setting signal is located, to obtain the plurality of possible transmission positions of the reference signal, wherein the position of the setting signal in the plurality of possible transmission positions and in the main reference signal is the same, and the main reference signal refers to a reference signal corresponding to the initial possible transmission position of the reference signal.

The technical solutions provided by the embodiments of the present disclosure may include the following beneficial effects:

A plurality of possible transmission positions of a reference signal may be obtained according to a position where a setting signal for determining an index of the reference signal is located, channel detection may be performed before transmitting the reference signal at each of the possible transmission positions, and the reference signal may be transmitted at the corresponding possible transmission position, in response to detecting that the channel is idle, such that the chance of transmitting the reference signal can be improved.

The setting signal for determining the index of the reference signal in the received reference signal is detected to obtain the position where the setting signal is located, and the signal set during the preset time interval is obtained according to the position where the setting signal is located, and the location information corresponding to the reference signal is determined according to the signal set, then the index of the reference signal is determined according to the location information, and time domain synchronization with the base station is performed according to the index of the reference signal, such that time domain synchronization can be realized through the cell where the unlicensed spectrum is located.

Since the device embodiments basically correspond to the method embodiments, for the relevant parts thereof, please refer to the description of the method embodiments. The above mentioned device embodiments are only illustrative, the units which are described as separate parts may be or may not be physically separated, and the parts shown as units may be or may not be physical units, that is, they may be located in the same place or may be distributed over a plurality of network units. All or part of the modules may be selected to realize the object of the solution of the present embodiment according to actual requirements. One of ordinary skill in this art may understand and practice this without paying creative work.

It should further be noted that, in this text, relational terms such as first and second, etc., are only used to distinguish one entity or operation from another entity or operation, and do not necessarily require or imply any such actual relations or orders present between the entities or operations. The terms "comprising", "including" or any other variations thereof are intended to cover a non-exclusive inclusion such that processes, methods, articles, or devices that contain a series of elements comprise not only those elements but also comprise other elements that are not explicitly listed. Alternatively, elements inherent to such processes, methods, articles, or devices can further be comprised. In case of no more limitations, an element defined by phase "comprising a . . . " does not exclude the situation where additional identical elements are present in the processes, the methods, the articles, or the devices comprising the element.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting a reference signal, performed by a base station, comprising:
   obtaining a plurality of possible transmission positions of the reference signal according to a position where a setting signal is located, wherein the setting signal is located in the reference signal and is used to determine an index of the reference signal, and the plurality of possible transmission positions comprise an initial possible transmission position of the reference signal;
   performing channel detection before transmitting the reference signal at each of the possible transmission positions; and
   transmitting, in response to detecting that a channel is idle, the reference signal at a corresponding possible transmission position;
   wherein the reference signal comprises a synchronization signal block (SSB), and the setting signal comprises PBCH in the SSB;
   wherein indexes of the reference signal corresponding to the plurality of possible transmission positions are the same;
   wherein the method further comprises:
   determining a signal in the reference signal as the setting signal; or
   determining different signals in the reference signal as the setting signal according to a transmission frequency point or a subcarrier interval of the reference signal.

2. The method according to claim 1, further comprising:
   determining the setting signal before obtaining the plurality of possible transmission positions of the reference signal according to the position where the setting signal is located.

3. The method according to claim 1, wherein a sequence in which a plurality of signals of the reference signal is sent on the plurality of possible transmission positions is PSS, PBCH, SSS and PBCH.

4. The method according to claim 1, wherein the setting signal is located at the same position in the plurality of possible transmission positions.

5. A base station, comprising:
   at least one processor; and
   a memory, for storing instructions executable by the at least one processor;
   wherein the at least one processor is configured to implement steps of the method for transmitting a reference signal according to claim 1.

6. A non-transitory computer-readable storage medium having computer instructions stored therein that, when executed by at least one processor, implements steps of the method for transmitting a reference signal according to claim 1.

7. A method for receiving a reference signal, performed by a user equipment (UE), comprising:
   receiving the reference signal sent by a base station;
   detecting a setting signal in the reference signal to determine a position where the setting signal is located, wherein the setting signal is used to determine an index of the reference signal;
   acquiring a signal set during a preset time interval according to the position where the setting signal is located;
   determining location information corresponding to the reference signal according to the signal set; and
   determining the index of the reference signal according to the location information, and performing time domain synchronization with the base station according to the index;
   wherein the reference signal comprises a synchronization signal block (SSB), and the setting signal comprises PBCH in the SSB;
   wherein indexes of the reference signal corresponding to the plurality of possible transmission positions are the same;
   wherein the method further comprises:
   determining a signal in the reference signal as the setting signal; or
   determining different signals in the reference signal as the setting signal according to a transmission frequency point or a subcarrier interval of the reference signal.

8. The method according to claim 7, wherein determining the location information corresponding to the reference signal according to the signal set comprises:
   comparing all signals at a second preset number of consecutive symbols comprising a symbol where the setting signal is located, in the signal set, with contents of a main reference signal or other reference signals respectively;
   in response to determining that a number of the signals at the second preset number of consecutive symbols that are successfully matched is one, using the second preset number of consecutive symbols that are successfully matched, as the location information; and
   in response to determining that the number of the signals at the second preset number of consecutive symbols that are successfully matched is more than one, starting from a last symbol of the signal set, using every second preset number of consecutive symbols as one group, and using symbols corresponding to a group comprising the symbol where the setting signal is located, as the location information.

9. The method according to claim 7, further comprising:
   determining the setting signal before detecting the setting signal for determining the index of the reference signal in the reference signal.

10. The method according to claim 7, wherein a sequence in which a plurality of signals of the reference signal is sent on the plurality of possible transmission positions is PSS, PBCH, SSS and PBCH.

11. The method according to claim 7, wherein the setting signal is located at the same position in the plurality of possible transmission positions.

12. A non-transitory computer-readable storage medium having computer instructions stored therein that, when executed by at least one processor, implements steps of the method for receiving a reference signal according to claim 6.

13. A user equipment, comprising:
   at least one processor; and
   a memory, for storing instructions executable by the at least one processor;
   wherein the at least one processor is configured to:
   receive a reference signal sent by a base station;
   detect a setting signal in the reference signal to determine a position where the setting signal is located, wherein the setting signal is used to determine an index of the reference signal;
   acquire a signal set during a preset time interval according to the position where the setting signal is located;
   determine location information corresponding to the reference signal according to the signal set; and determine the index of the reference signal according to the location information, and perform time domain synchronization with the base station according to the index;

wherein the reference signal comprises a synchronization signal block (SSB), and the setting signal comprises PBCH in the SSB;

wherein indexes of the reference signal corresponding to the plurality of possible transmission positions are the same;

wherein the at least one processor is further configured to:

determine a signal in the reference signal as the setting signal; or determine different signals in the reference signal as the setting signal according to a transmission frequency point or a subcarrier interval of the reference signal.

14. The user equipment according to claim 13, wherein the at least one processor is further configured to:

compare all signals at a second preset number of consecutive symbols comprising a symbol where the setting signal is located, in the signal set, with contents of a main reference signal or other reference signals respectively;

in response to determining that a number of the signals at the second preset number of consecutive symbols that are successfully matched is one, use the second preset number of consecutive symbols that are successfully matched, as the location information; and in response to determining that the number of the signals at the second preset number of consecutive symbols that are successfully matched is more than one, starting from a last symbol of the signal set, use every second preset number of consecutive symbols as one group, and use symbols corresponding to a group comprising the symbol where the setting signal is located, as the location information.

15. The user equipment according to claim 13, wherein the at least one processor is further configured to:

determine the setting signal before detecting the setting signal for determining the index of the reference signal in the reference signal.

16. The user equipment according to claim 13, wherein a sequence in which a plurality of signals of the reference signal is sent on the plurality of possible transmission positions is PSS, PBCH, SSS and PBCH.

17. The user equipment according to claim 13, wherein the setting signal is located at the same position in the plurality of possible transmission positions.

* * * * *